United States Patent
Kühne et al.

[11] Patent Number: 6,105,734
[45] Date of Patent: Aug. 22, 2000

[54] AIR OPERATED DISK BRAKE FOR VEHICLES AND METHOD FOR THE MANUFACTURE THEREOF

[75] Inventors: Victor Kühne, Bopfingen; Hans Baumgartner, Moosburg; Dieter Bieker, Oberaudorf, all of Germany

[73] Assignee: Knorr-Bremse fur Nutzfahrzeuge GmbH, Munich, Germany

[21] Appl. No.: 09/284,354

[22] PCT Filed: Oct. 13, 1997

[86] PCT No.: PCT/EP97/05622

§ 371 Date: Jun. 25, 1999

§ 102(e) Date: Jun. 25, 1999

[87] PCT Pub. No.: WO98/16756

PCT Pub. Date: Apr. 23, 1998

[30] Foreign Application Priority Data

Oct. 14, 1996 [DE] Germany .......................... 196 42 384

[51] Int. Cl.[7] ..................................................... F16D 55/02
[52] U.S. Cl. ...................... 188/71.8; 188/71.7; 188/71.1; 188/73.35
[58] Field of Search ................... 188/71.7, 71.8, 188/71.1, 73.35, 73.36, 73.37, 72.4

[56] References Cited

U.S. PATENT DOCUMENTS

| | | | |
|---|---|---|---|
| 3,498,423 | 3/1970 | Belart | 188/71.9 |
| 3,507,365 | 4/1970 | Falk . | |
| 3,532,192 | 10/1970 | Falk . | |
| 3,543,887 | 12/1970 | Hodkinson . | |
| 3,590,964 | 7/1971 | Krause | 188/71.9 |
| 3,601,233 | 8/1971 | Marschall et al. | 188/71.9 |
| 3,939,945 | 2/1976 | Habgood . | |
| 3,999,638 | 12/1976 | Margetts | 188/71.9 |
| 4,595,083 | 6/1986 | Mackenzie et al. | 188/71.8 |
| 5,168,964 | 12/1992 | Shimmell | 188/72.4 |
| 5,353,896 | 10/1994 | Baumgartner et al. | 188/71.9 |
| 5,379,867 | 1/1995 | Macke et al. | 188/71.9 |

FOREIGN PATENT DOCUMENTS

| | | | |
|---|---|---|---|
| 108 680 | 5/1984 | European Pat. Off. . | |
| 7018145 | 5/1970 | France . | |
| 2557302 | 6/1977 | Germany . | |
| 2742319 | 3/1978 | Germany . | |
| 3716202 | 11/1988 | Germany | 188/71.9 |
| 4236683 | 5/1994 | Germany . | |
| 4236684 | 5/1994 | Germany . | |
| 6-109042 | 4/1994 | Japan . | |

Primary Examiner—Robert J. Oberleitner
Assistant Examiner—Devon Kramer
Attorney, Agent, or Firm—Barnes & Thornburg

[57] ABSTRACT

A disk brake for vehicles, especially for utility vehicles, comprising brake shoes, an application on both sides of the brake disk which applies one of the brake shoes, and a force transmitting device to transmit application force to the brake shoe on the other side of the disk brake. The force transmitting device is shaped like a fully enclosed frame, which absorbs the application forces. A modular element of the force transmitting device enables brake mechanism to be premounted and improves structural rigidity.

26 Claims, 4 Drawing Sheets

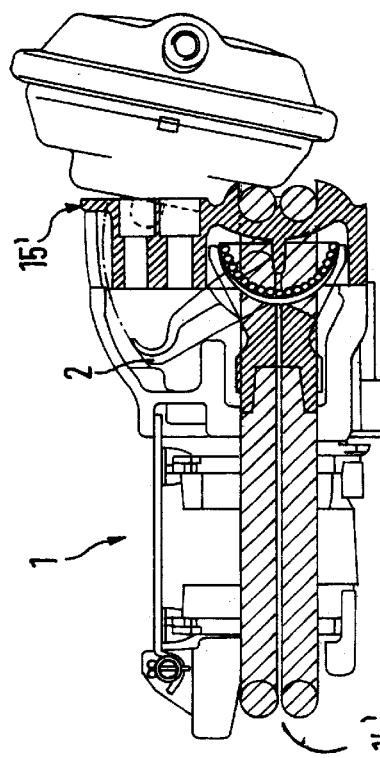
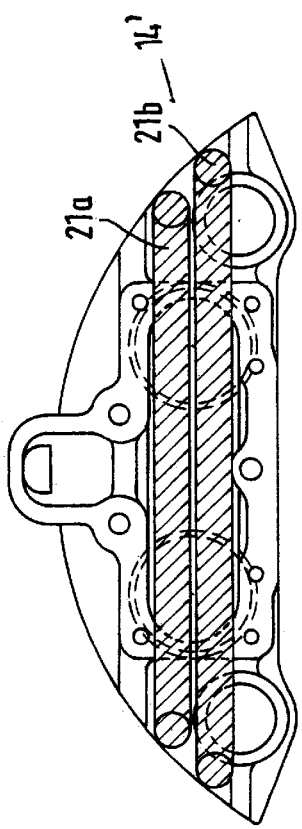
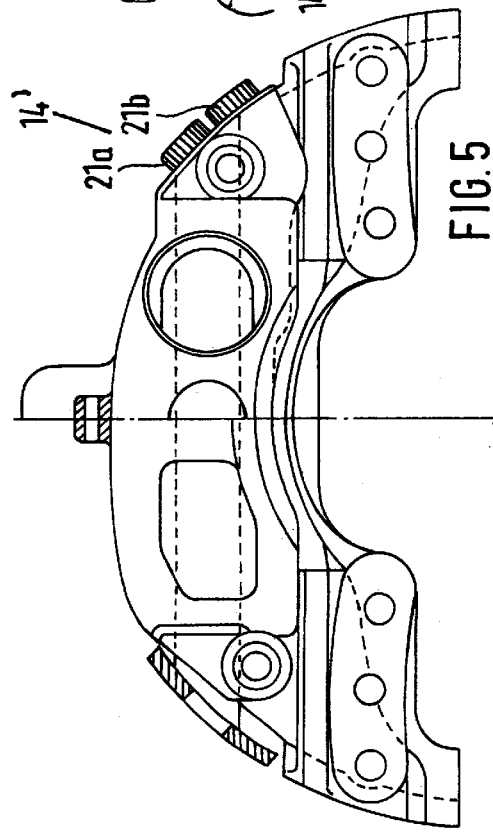
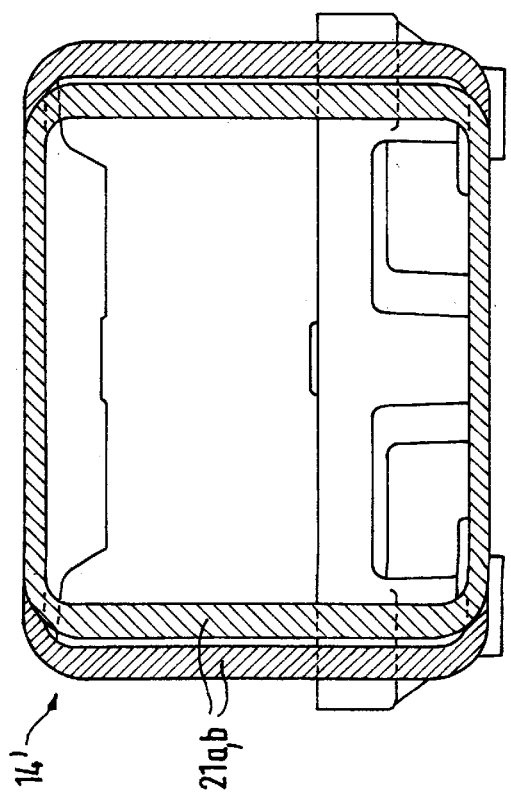

AIR OPERATED DISK BRAKE FOR VEHICLES AND METHOD FOR THE MANUFACTURE THEREOF

BACKGROUND AND SUMMARY OF THE INVENTION

The invention relates generally to an air-operated disk brake for vehicles, particularly for utility vehicles, preferably a utility vehicle disk brake with a ratio between the inside disk diameter and the outside disk diameter of 0.6. The brakes have brake shoes with brake linings arranged on both sides of a brake disk, have an application device for the application of one of the brake shoes and have a force transmission device for transmitting the application force to the brake shoe on the other side of the brake disk. The invention also relates to a method for the manufacturing thereof.

A disk brake of this type is illustrated in German Patent Document DE PS 37 16 202. The disk brake disclosed in this document is pneumatically operated and is therefore suitable mainly for use in the utility vehicle field, where it has had good results in practice. A cast caliper is used as the force transmitting device for transmitting the application force to the brake shoe on the other side of the brake disk. Constructive simplification is desirable for reducing the weight and lowering the manufacturing costs. The invention aims at solving this problem.

The invention achieves this goal. In contrast to the prior art of this type, a one-piece or multi-part modular element is provided for receiving elements of the application device, which are significant with respect to the operation. The force transmitting device is constructed as a closed frame which surrounds the modular element together with the application device inserted in the modular element as well as both brake shoes (particularly such that it completely absorbs the application forces). The modular element is constructed such that it significantly increases the rigidity of the frame in the area of the modular element. The modular element preferably increases the rigidity of the frame such that, in the area of the modular element, the frame essentially absorbs only normal forces, that is, tension and/or pressure forces.

The special advantage of this construction is replacing the massive cast caliper which is customary in the case of disk brakes and, in pneumatically and hydraulically operated utility vehicle disk brakes, is even considered indispensable. The frame must only surround the operationally necessary elements of the disk brake such that the transmission to the side of the brake disk facing away from the application device or the second brake shoe with the second brake lining will present no problems. The modular element ensures a sufficient rigidity of the construction while the frame has a simple design. The invention therefore has the particular advantage of weight reduction and drastically lowers the costs for manufacturing the brake.

Although attempts were made in the field of hydraulically operated disk brakes for passenger cars to simplify or even save the caliper, the solutions selected cannot be applied to utility vehicle dimensions. Thus, for example, German Patent Document DE OS 42 36 683 shows a floating caliper partial-lining disk brake, for achieving a lower weight and lower manufacturing costs. The floating caliper is formed of two axially spaced parts which are connected with one another by struts made of a high-strength material which extend over the brake disk and bridge the distance between the caliper parts.

The shown disk brake is constructed as a hydraulic brake and, because of its mechanical construction, is suitable only for a use in passenger cars. A similar solution is shown by German Patent Document DE OS 27 42 319, wherein a U-shaped bow is fastened on its open side to a tensioning device. However, it was recognized in none of these documents that it is particularly advantageous for the device for transmitting and absorbing brake reaction forces to virtually enclose the "whole" brake all around. Additional connection points to other elements, such as brake anchors, etc., which may always be a possible source of failure, are eliminated.

From European Patent Document EP 0108 680, a hydraulically operated disk brake is known whose caliper is produced in a light-weight construction as a sheet metal frame. However, this is still a complete caliper which has a simple and therefore inexpensive construction only because it is used in light passenger cars. This construction cannot be transferred to utility vehicles because the occurring braking forces are much larger than in the case of passenger cars. On the contrary, a massive cast caliper would be obtained again if it were tried, based on the construction of European Patent Document EP 0 108 680, to implement a disk brake also suitable for heavy utility vehicles.

In order to utilize the advantages of a low-cost frame also for utility vehicles, in contrast to the above-mentioned light hydraulic brakes which implement the caliper only as an inexpensive caliper corresponding to the braking forces to be controlled, the invention divides the caliper into two components: the frame and the modular element. The modular element accommodates the application device (and its operationally important parts) as well as preferably also the bearing of the brake anchor. The modular element is preferably constructed and geometrically dimensioned such that the frame is used only for transmitting tensile forces and can be limited to a minimal constructive shape (for example, as a surrounding band). The remaining inherent rigidity of the brake is essentially implemented by the modular element.

The whole application mechanism can be integrated in the modular element (and optionally the guiding device relative to the brake anchor, which guiding device corresponds to the conventional "caliper guide"). The modular element, which is preferably constructed as a diecast part and/or consists of light metal, has recesses/openings for this purpose into which the whole application mechanism can be inserted. In a particularly advantageous manner, this permit a type of premounting of the "brake core", i.e., of the application mechanism together with the adjusting devices and the brake anchor guide. Thus premounted unit must only still be placed in the surrounding frame. In this manner, the manufacturing costs are reduced further. From the interaction of the modular element and the frame, an adequate caliper operation and a complete replacement of a cast caliper is achieved by two particularly lightly constructed elements at reasonable cost.

Since the module can be constructed as a diecast part, only little machining may be needed and thus a low-cost machining obtained. Diecasting can be used because all application forces are applied only in the form of compressive strains. In comparison to conventional disk brakes for utility vehicles with a cast caliper, the modular unit is particularly light. In addition, the invention results in a modular solution because the different installation conditions can easily be met by a modification of the frame, the module, as a rule, remaining unchanged. In contrast to conventional cast constructions, installation advantages are obtained because high-strength materials can be used in comparison to castings, which are also lighter.

Constructively and for reasons of a uniformly distributed force transmission, it is also a special advantage for the frame and the modular element to be constructed such that a flat supporting of the modular element takes place in the braking torque direction, that is, on the side of the modular element facing away from the brake disk. The module therefore absorbs the application forces our a large-surface. This can also be promoted by the fact that the frame is constructed as a band (in the case of a utility vehicle brake, the band is, for example, approximately 5 cm wide). The band preferably consists of deformed steel plates which are firmly welded to one another and/or riveted to one another. The low-cost band produced in this manner can also safely withstand the most strenuous constant stress and can be designed in a particularly simple manner, if it is provided with devices for reinforcing the frame (such as "tension" struts).

According to another, particularly preferred variant of the invention, at least some of the struts reach through recesses of the modular unit so that the modular unit is secured in a simple manner against a falling-out and can be mounted in an uncomplicated fashion. In addition, the struts provide the frame with rigidity. In a secure form, the frame comprises the modular element as well as both brake linings as well as the upper section of the brake anchor. Optionally, a stabilizing element is inserted on the inside between the frame and the brake lining or brake shoe on the side of the brake disk situated opposite the modular element.

Summarizing, as the result of the low requirements with respect to the material and the uncomplicated mounting of the invention, a disk brake is obtained which can be produced at an extremely reasonable price and is suitable also for the continuous and industrial scale use in heavy utility vehicles.

According to a further development and variant according to the invention, the invention solves the problem of a disk brake of this type in that the force transmitting device is constructed as a closed frame which surrounds the application device as well as both brake shoes at least essentially, the frame at least partially having a wound structure. The frame (for example, together with an optional modular element) is preferably constructed as a composite part which has a wound structure at least in the area of the flow of force between the operating side and the reaction side. In contrast to the prior art of this type, this disk brake has a higher structural rigidity as well as a clearly reduced weight.

In comparison to the known cast calipers made of high-strength iron materials, the construction according to the invention has the special advantage that, because of its particularly simple design and geometry, the frame must absorb no complex and superimposed tension conditions from tensile/pressure and bending stresses. The wound structure transmits only the occurring reaction forces between the application side and the reaction side. Because of its wound structure, it is also less susceptible to cracks than the prior art. In addition, because of the wound structure (with a suitable selection of material), a frame can be implemented which has a particularly small cross-section, which again lowers the weight of the brake and the manufacturing costs.

In a particularly preferred manner, the one-piece or multi-part modular element is again provided with recesses for receiving operationally necessary elements of the application device. The wound structure is constructed as a wound frame which surrounds the modular element as well as the two brake shoes. The modular or basic element is again further developed such that it carries out all functions of a caliper (with the exception of a complete load absorption).

The wound structure expediently consists of a high-strength material whose modulus of elasticity is lower than the modulus of elasticity of the wound frame. The special advantage of a reinforcing winding of a high-strength material is that its cross-section can be dimensioned to be so small that it is arranged precisely in the flow of force of the caliper frame without impairing other functions of the caliper. As a result, the transmission of the reaction forces takes place exclusively in the reinforcing winding in the form of tensile stresses and the basic body is only exposed to low stresses. This also makes it possible for the basic body to be cast of light metals, such as aluminum, and to be designed to be less stable than in the prior art, which again lowers the weight of the disk brake as well as its manufacturing costs. According to another variant of the invention, it is finally even possible to construct the modular element to be resilient in sections.

According to another particularly preferred variant of the invention, the modular element also has open grooves or closed passage ducts which are designed for the complete or partial accommodation of the winding structure. The grooves considerably simplify the manufacturing of the disk brakes because it is only necessary to place the prefabricated wound frame in these grooves during the mounting of the brake. As an alternative, it is also possible for the wound frame to be cast in the light-metal casting of the modular element. Although in this case the frame still surrounds the significant sections of the application device, a composite part is created which is particularly reliable in the continuous operation.

A simple method is provided for manufacturing the disk brakes according to the invention wherein the force transmitting device is wound as a closed frame from a (for example, synthetic) fiber.

Other objects, advantages and novel features of the present invention will become apparent from the following detailed description of the invention when considered in conjunction with the accompanying drawings.

BRIEF DESCRIPTION OF THE DRAWINGS

FIGS. 3 to 7 are various views of another embodiment of the invention.

DETAILED DESCRIPTION OF THE PREFERRED EMBODIMENTS

Figure 1:
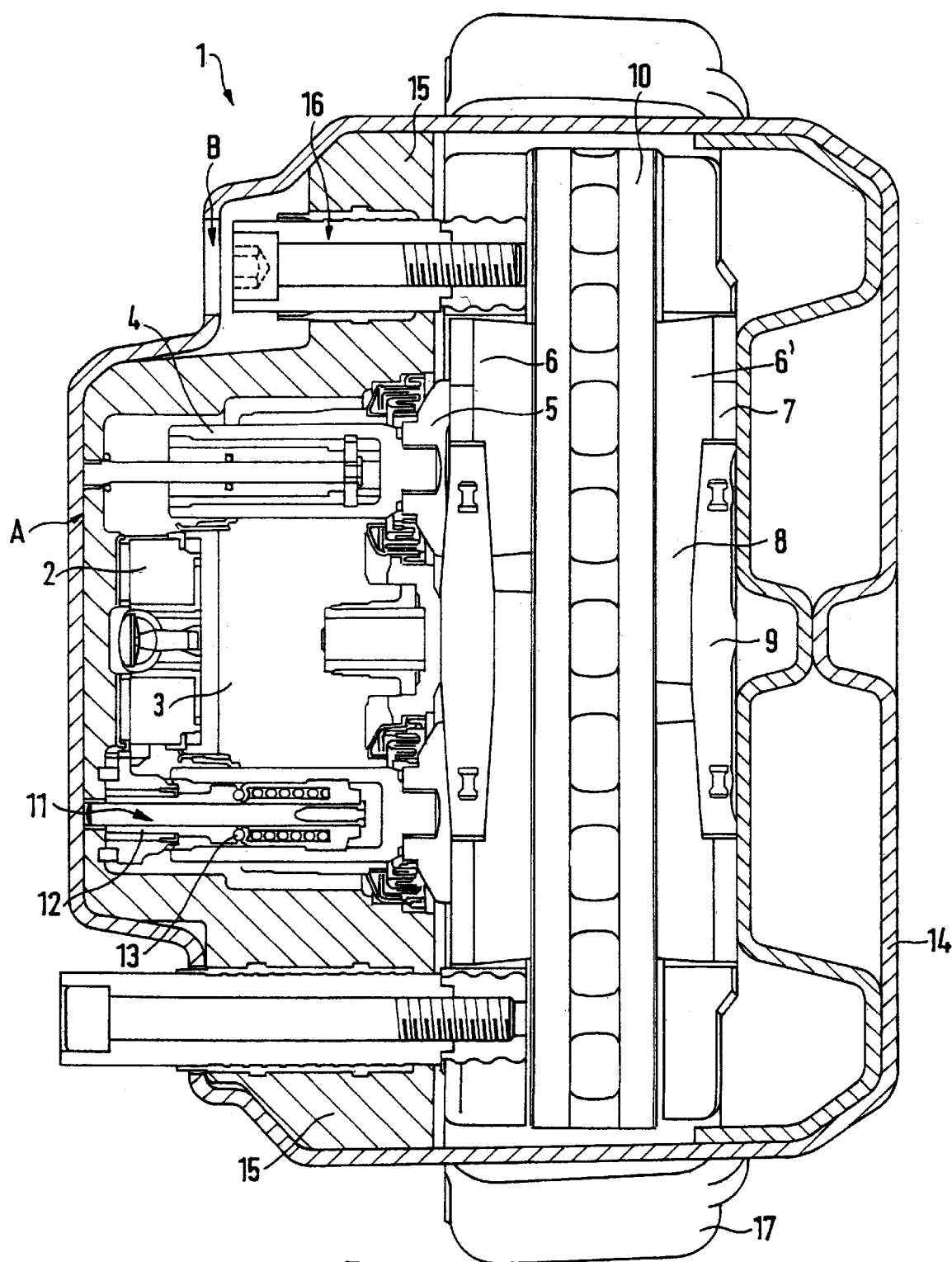
FIG. 1 is a first sectional view of a disk brake according to the invention.

The disk brake 1 illustrated in FIG. 1 is constructed as a pneumatically operated disk brake for utility vehicles. When a brake cylinder (not shown here) is operated, an eccentrically roller-disposed lever 2 is operated by the piston rod (also not shown) of the cylinder. The introduced force is transmitted by the bridge 3 and integrated threaded spindles 4 with plungers 5 to the brake shoe 6 (with a—preferably two-layer—lining carrier 7, lining material 8 and an anti-rattle spring 9) with a force F1. The brake shoe 6 is supported on the brake disk 10.

Before the transmission of the braking force to the other side of the brake disk will be explained, the function of the wear adjustment will be briefly stated. An automatic wear adjusting device (adjusting device) 11 is situated in one of the two tube-shaped threaded spindles 4 which are connected with one another by a (not shown) chain or an analogous device. During each brake operation, the lever 2 operates the adjusting device 11 by a shift fork (not shown). The adjusting device 11 has an inner sleeve 12 which is rotated along by the rotation of the shift fork. The rotating movement is transmitted by a ball ramp 13 to the threaded spindle 4. In the case of a correct lifting play, no adjustment will take place.

For the transmission of the braking force to the other side of the brake disk 10 or the brake shoe 6', a force transmitting device 14 is used instead of the otherwise customary cast caliper construction. The force transmitting device 14 is constructed in the manner of a frame 14 which is closed on all sides and which completely absorbs the application forces. The frame 14 encloses a modular element 15 as well as both brake shoes 6 and 6' and the upper section of the brake anchor 17.

In the one-piece modular element 15 constructed as a diecast part, a guiding device 16 is integrated which corresponds to the conventional "brake caliper guide". In addition, the whole application device or mechanism (parts 2 to 5) together with the adjusting device (11–13) are integrated in a premountable manner in correspondingly constructed recesses of the modular element 15.

The band-type frame 14 and the modular element 15 are constructed such that a flat supporting of the modular element takes place in the braking torque direction, that is, in the side of the modular element facing away from the brake disk; see arrow A. In area B, the band-type frame 14 is fixedly welded and riveted.

Figure 2:
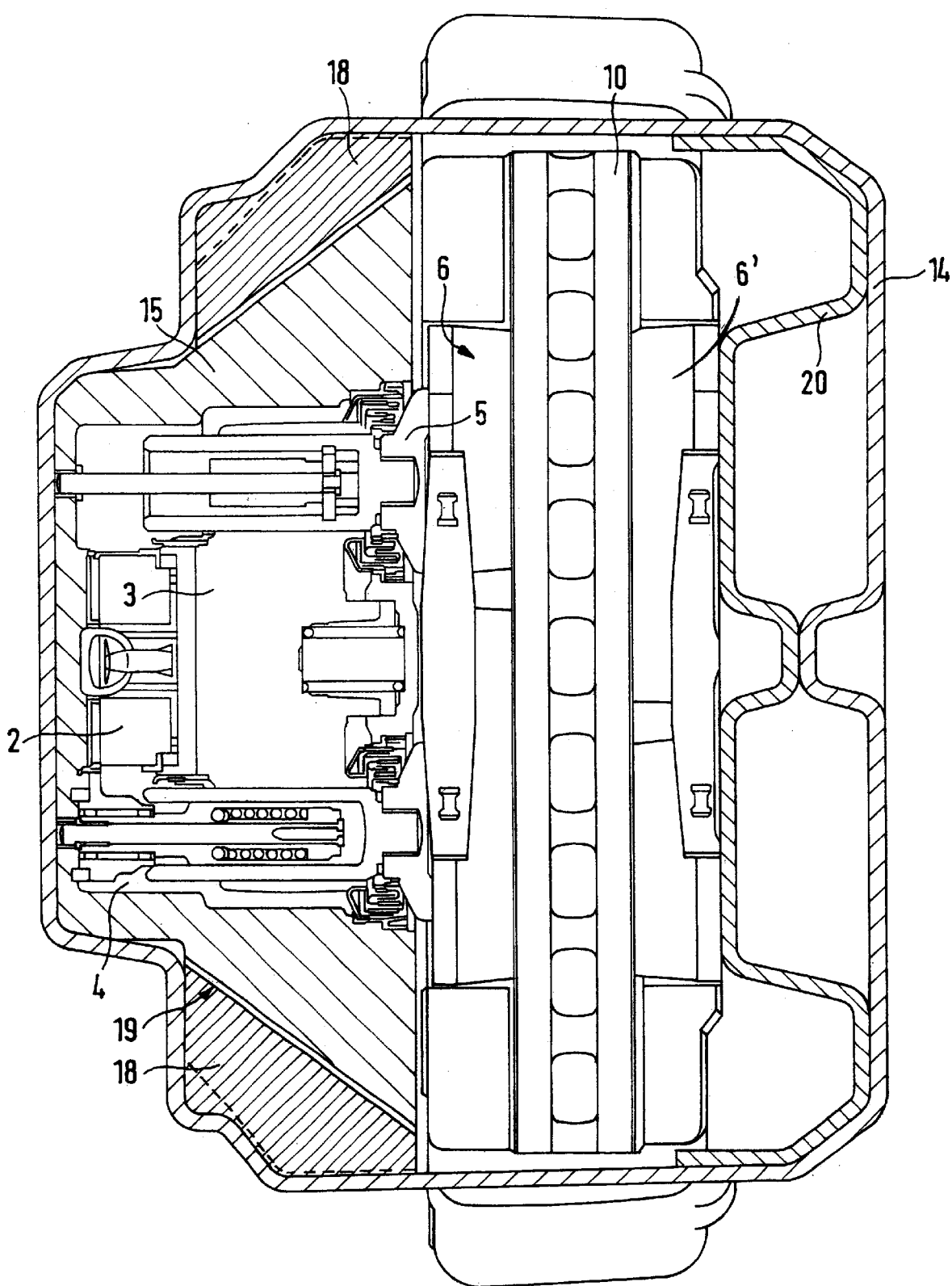
FIG. 2 is another sectional view of the disk brake according to the invention of FIG. 1.
Figure 3:
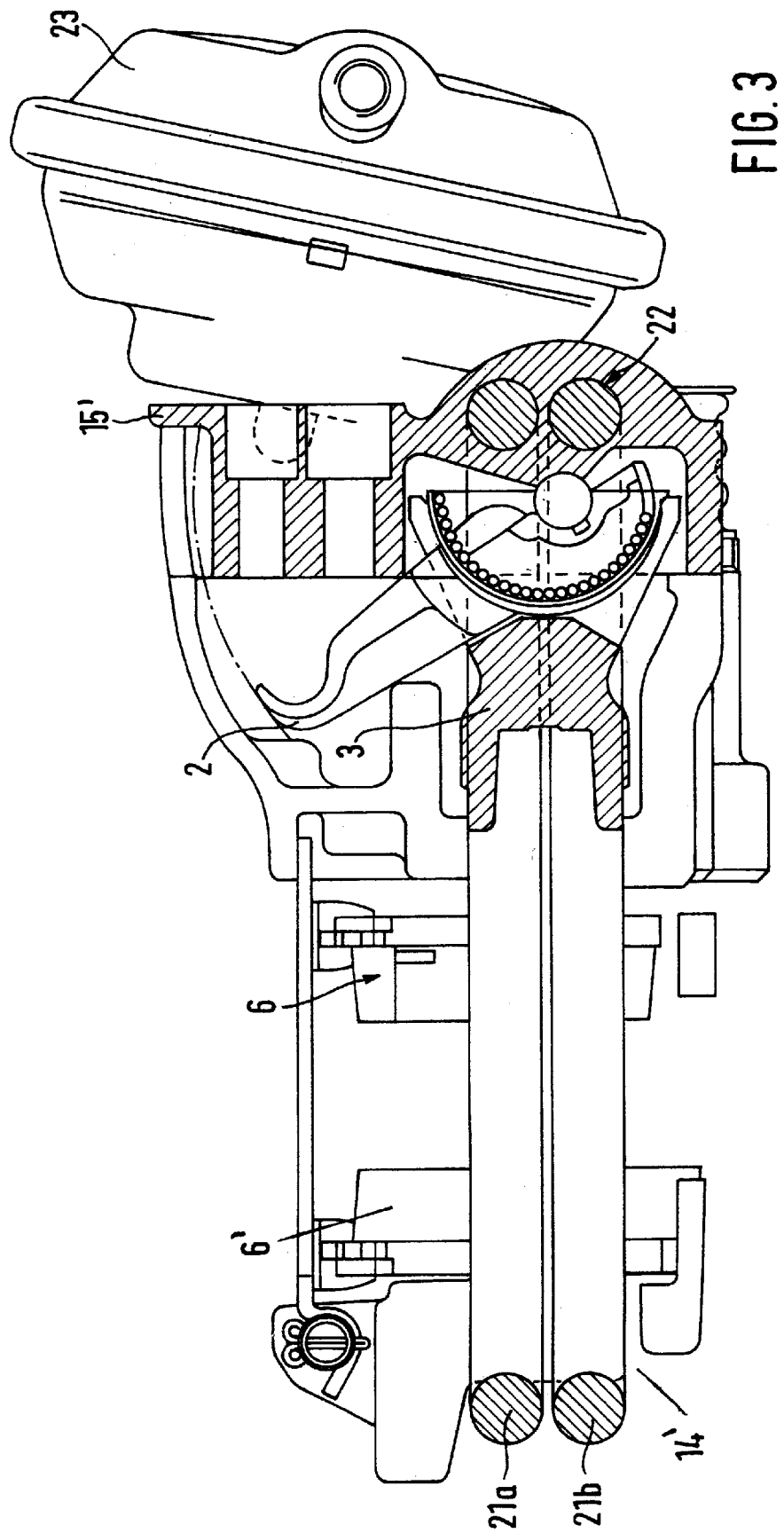

As illustrated in FIG. 2, the frame 14 is provided with strut-type devices 18 which provide the frame 14 with additional rigidity. The struts 18 reach through recesses 19 of the modular unit 15 so that the fit of the modular unit 15 is defined in a simple manner. A stabilizing element 20 (here, a steel structure) is also inserted between the frame 14 and the brake shoe 6' on the side of the brake disk 10 opposite the modular element 15. By a variation of the geometry of this element, the brake can be adapted in a simple manner to the most varied installation situations.

Another embodiment of the invention is illustrated in FIGS. 3 to 7. In this embodiment, a wound frame 14' is used instead of a band-type frame. The wound frame 14' has two winding strands 21*a* and *b* which are situated directly side-by-side and are wound in a "cable-type" manner from carbon fibers. The fibers are aligned essentially in the direction of the flow of force. The structure formed in this manner is highly stable and largely insensitive to the formation of cracks. As illustrated in the top view of FIG. 6, the wound frame 14' has a rectangular geometry which can therefore be implemented extremely easily. The strands 21 have a circular cross-section and are flattened only in the area of the rounded corners of the rectangle, which is the result of the respectively necessary 90°-deflections of the wound frame. On the application side, the wound frame 14' reaches through passage ducts 22 of a modified modular element 15'. The preassembled wound frame is placed in the casting mold for the modular element 15' during the casing of the modular element 14, and is cast together with it so that a composite body is formed. Also in this embodiment of the invention, when the brake cylinder 23 is operated by a piston rod (not shown), an eccentrically roller-disposed lever 2 is operated. The introduced force is transmitted as reaction force by the bridge 3 and integrated threaded spindles (not shown here) to a brake shoe 6 with a force F1. In this case, the brake shoe 6 is supported on the brake disk (not shown). For transmitting the braking force to the other side of the brake disk or the brake shoe 6', the wound frame 14' is used, which also in this case completely absorbs the application forces.

Although the present invention has been described and illustrated in detail, it is to be clearly understood that the same is by way of illustration and example only, and is not to be taken by way of limitation. The spirit and scope of the present invention are to be limited only by the terms of the appended claims.

REFERENCE NUMBERS

Disk brake 1
lever 2
bridge 3
threaded spindles 4
plunger 5
brake shoe 6
lining carrier 7
lining material 8
antirattling spring 9
brake disk 10
adjusting device 11
inner sleeve 12
ball ramp 13
frame 14
modular element 15
guiding device 16
brake anchor 17
struts 18
recesses 19
stabilizing element 10
wound strands 21*a, b*
passage ducts 22
brake cylinder 23

What is claimed is:

1. An air-operated disk brake for utility vehicles comprising:
    a) brake shoes on both sides of a brake disk,
    b) an application device for the application of one of the brake shoes,
    c) a force transmitting device for transmitting the application force to the brake shoe on the other side of the brake disk,
    d) a modular element having recesses accommodating operational elements of the application device,
    e) the force transmitting device being a closed frame which surrounds the modular element as well as both brake disks, the frame having a band-type construction,
    f) the modular element being constructed such that it significantly increases the rigidity of the frame in the area of the modular element.

2. A disk brake according to claim 1, wherein the modular element increases the rigidity of the frame in the area of the modular element, such that the frame essentially absorbs only normal forces.

3. A disk brake according to claim 1 wherein the frame and the modular element are shaped such that a flat supporting of the modular body takes place with respect to the frame in the application direction.

4. A disk brake according to claim 1 wherein the frame and the modular element are shaped such that a flat supporting of the modular element with respect to the frame takes place in the braking torque direction.

5. A disk brake according to claim 1 including at least one brake anchor bearing device integrated in the modular element.

6. A disk brake according to claim 1 wherein the modular element is a diecast part.

7. A disk brake according to claim 1 wherein the modular element consists of a light metal.

8. A disk brake according to claim 1 wherein the band-type frame includes deformed steel plates which are welded and/or riveted to one another.

9. A disk brake according to claim 1 wherein the frame includes devices for reinforcing the frame.

10. A disk brake according to claim 9 wherein devices for reinforcing the frame include struts.

11. A disk brake according to claim 10 wherein at least some of the struts reach through recesses of the modular element.

12. A disk brake according to claim 1 wherein the frame encloses the modular element, both brake shoes and the upper section of a brake anchor.

13. A disk according to claim 1 including a stabilizing element inserted between the frame and the brake shoe on the brake disk opposite the modular element.

14. An air-operated disk brake for utility vehicles comprising:

brake shoes on both sides of a brake disk, an application device for the application of one of the brake shoes, a force transmitting device for transmitting the application force to the brake shoe on the other side of the brake disk, the force transmitting device being a closed frame which surrounds the application device and both brake shoes, and the frame having at least partially a wound structure or being constructed as a fiber composite.

15. A disk brake according to claim 14 wherein the frame has the wound structure at least in the area of the flow of force between an operating side and a reaction side of the disk brake.

16. A disk brake according to claim 14 wherein the wound structure consists of a high-strength steel or of a high-strength fiber composite or carbon fiber.

17. A disk brake according to claim 14 including modular element with recesses accommodating operationally elements of the application device.

18. A disk brake according to claim 17 wherein the frame, encloses the modular element as well as the two brake shoes.

19. A disk brake according to claim 17 wherein the modular element consists of a material whose modulus of elasticity is lower than the modulus of elasticity of the wound frame.

20. A disk brake according to claim 17 wherein the modular element is aluminum.

21. A disk brake according to claim 17 wherein the modular element has open grooves or closed passage ducts which completely or partially accommodates the wound frame.

22. A disk brake according to claim 17 wherein the wound frame is a prefabricated element which can be mounted to the modular element.

23. A disk brake according to claim 17 wherein the wound frame is cast into a light-metal casting of the modular element.

24. A disk brake according to claim 14 wherein the wound frame has a rectangular shape and consists of two separate wound strands situated side-by-side.

25. A process of manufacturing an air-operated disk brake for utility vehicles, wherein the disk brake incudes a) brake shoes on both sides of a brake disk, b) an application device for the application of one of the brake shoes, and c) a force transmitting device for transmitting the application force to the brake shoe on the other side of the brake disk, the force application device has a modular element, the method including:

forming the force transmitting device by winding a fiber into a closed frame, and positioning the closed frame in a mold, and casting the modular element in the mold.

26. A method according to claim 25, including: forming a modular element of the force transmitting device with grooves or closed passage ducts; and positioning the frame in the grooves or ducts.

* * * * *